(12) United States Patent
Morenko

(10) Patent No.: US 8,096,130 B2
(45) Date of Patent: Jan. 17, 2012

(54) FUEL CONVEYING MEMBER FOR A GAS TURBINE ENGINE

(75) Inventor: Oleg Morenko, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 1009 days.

(21) Appl. No.: 11/489,533

(22) Filed: Jul. 20, 2006

(65) Prior Publication Data

US 2008/0016870 A1    Jan. 24, 2008

(51) Int. Cl.
*F02C 1/00* (2006.01)
(52) U.S. Cl. .......................... 60/739; 60/734
(58) Field of Classification Search .............. 60/739, 60/734, 740, 737, 742, 747, 746
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 3,213,523 A | 10/1965 | Boehler | |
| 3,472,025 A | 10/1969 | Simmons et al. | |
| 3,498,059 A * | 3/1970 | Harvey et al. | 60/742 |
| 4,100,733 A | 7/1978 | Streibel et al. | |
| 4,222,243 A * | 9/1980 | Mobsby | 60/742 |
| 4,322,945 A | 4/1982 | Peterson et al. | |
| 4,327,547 A * | 5/1982 | Hughes et al. | 60/39.463 |
| 4,404,806 A | 9/1983 | Bell, III et al. | |
| 4,483,137 A | 11/1984 | Faulkner | |
| 5,036,657 A | 8/1991 | Seto et al. | |
| 5,253,471 A | 10/1993 | Richardson | |
| 5,271,219 A | 12/1993 | Richardson | |
| 5,396,759 A | 3/1995 | Richardson | |
| 5,400,968 A | 3/1995 | Sood | |
| 5,415,000 A * | 5/1995 | Mumford et al. | 60/747 |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A | 6/1998 | Hansel et al. | |
| 5,848,525 A | 12/1998 | Spencer | |
| 5,956,955 A | 9/1999 | Schmid | |
| 5,983,642 A * | 11/1999 | Parker et al. | 60/737 |
| 5,996,335 A | 12/1999 | Ebel | |
| 6,109,038 A | 8/2000 | Sharifi et al. | |

(Continued)

FOREIGN PATENT DOCUMENTS

CA    1013153    7/1977

(Continued)

*Primary Examiner* — Ehud Gartenberg
*Assistant Examiner* — Gerald Sung
(74) *Attorney, Agent, or Firm* — Norton Rose OR LLP

(57) ABSTRACT

A gas turbine engine fuel conveying member in fluid flow communication with at least one fuel nozzle, the fuel conveying member having at least first and second member portions sealingly engaged to one another, and means for conveying fuel defined at a junction between the first and second member portions. The means for conveying fuel is defined by at least part of two different walls of each of the first and second member portions.

13 Claims, 5 Drawing Sheets

U.S. PATENT DOCUMENTS

| | | |
|---|---|---|
| 6,141,968 A | 11/2000 | Gates et al. |
| 6,149,075 A | 11/2000 | Moertle et al. |
| 6,240,732 B1 * | 6/2001 | Allan .................. 60/739 |
| 6,256,995 B1 | 7/2001 | Sampath et al. |
| 6,463,739 B1 | 10/2002 | Mueller et al. |
| 6,761,035 B1 | 7/2004 | Mueller |
| 2003/0014979 A1 | 1/2003 | Summerfield et al. |
| 2005/0188699 A1 * | 9/2005 | Shafique et al. .......... 60/739 |
| 2007/0204622 A1 * | 9/2007 | Patel et al. ............ 60/772 |

FOREIGN PATENT DOCUMENTS

| | | |
|---|---|---|
| CA | 2307186 | 5/1999 |
| EP | 0660038 | 6/1995 |
| EP | 0939275 | 9/1999 |
| GB | 2404976 | 2/2005 |
| WO | WO 9504244 | 2/1995 |

* cited by examiner

US 8,096,130 B2

FUEL CONVEYING MEMBER FOR A GAS TURBINE ENGINE

TECHNICAL FIELD

The invention relates generally to gas turbine engines and, more particularly, to an improved fuel conveying member therefor.

BACKGROUND OF THE ART

Known rigid internal fuel manifolds include manifolds manufactured from a solid ring in which a plurality of channels are machined, from example through a turning operation. Each channel is usually sealed by a thin sheet of metal brazed to the solid ring to define a fuel conduit therein. Other types of fuel conveying members can be similarly manufactured, one example being fuel nozzle stems. While this configuration presents several advantages, improvements remain desirable.

SUMMARY OF THE INVENTION

It is therefore an object of this invention to provide an improved fuel conveying member.

In one aspect, the present invention provides a gas turbine engine fuel conveying member in fluid flow communication with at least one fuel nozzle, the fuel conveying member comprising a first member portion having a first inner surface including a plurality of first walls, and a second member portion having a second inner surface including a plurality of second walls, the first and second inner surfaces being sealingly engaged to one another along at least two separate locations, the first and second walls cooperating to define at least one sealed conduit enclosed by the first and second member portions between the at least two separate locations.

In another aspect, the present invention provides a method of manufacturing a gas turbine engine fuel conveying member comprising machining an inner surface of a first member portion to define a plurality of first walls, machining an inner surface of a second member portion to define a plurality of second walls so that the second walls are complementary to the first walls to define at least one conduit therewith, and sealingly engaging the first and second member portions along separate locations on the machined inner surfaces to define and seal the at least one conduit therebetween.

In a further aspect, the present invention provides a fuel conveying member comprising at least first and second member portions sealingly engaged to one another, and means for conveying fuel defined at a junction between the first and second member portions, the means for conveying fuel being defined by at least part of two different walls of each of the first and second member portions.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
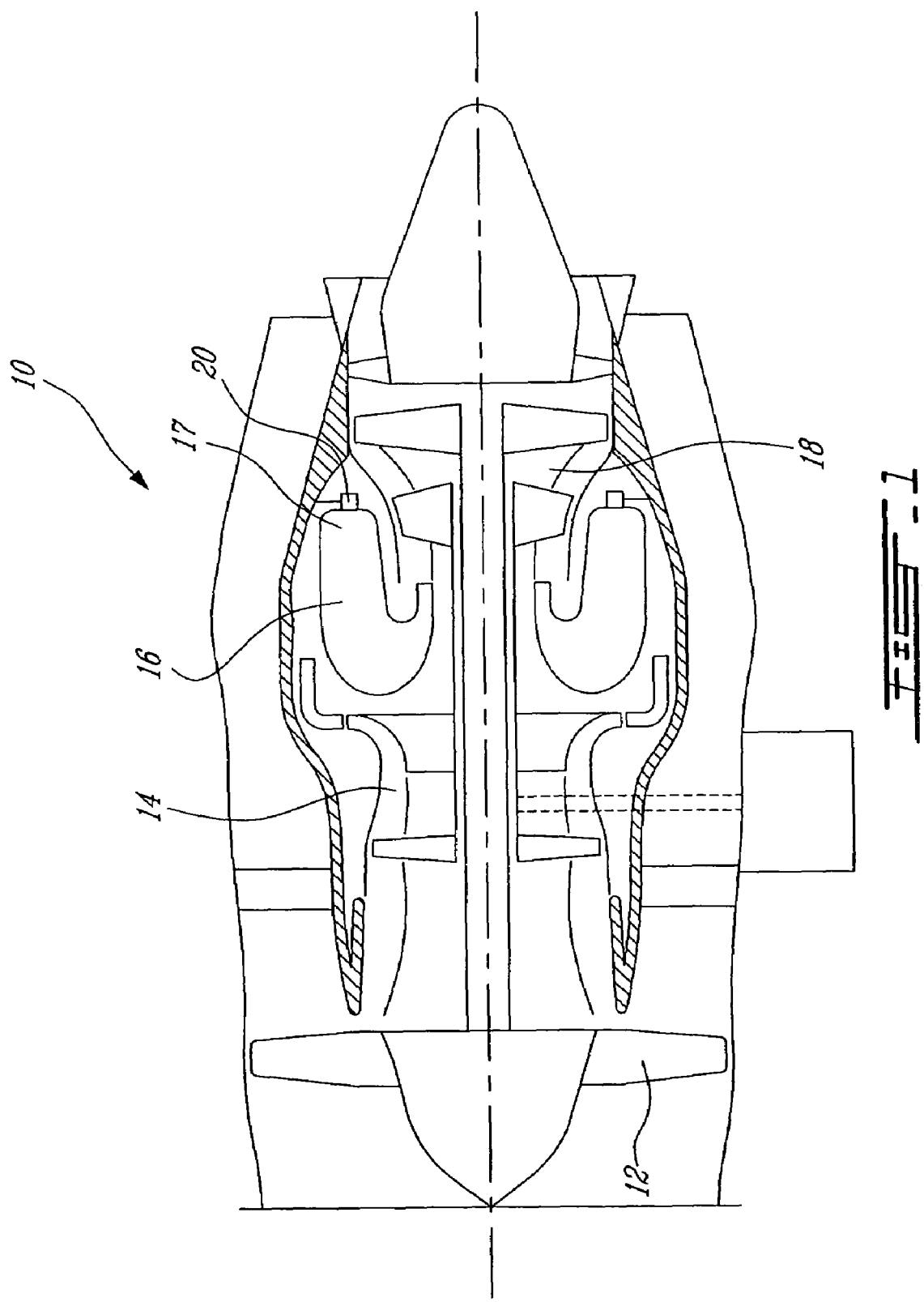
FIG. 1 is a schematic cross-sectional view of a gas turbine engine.

FIG. 1 illustrates a gas turbine engine 10 generally comprising, in serial flow communication, a fan 12 through which ambient air is propelled, a compressor section 14 for pressurizing the air, a combustion section 16 in which the compressed air is mixed with fuel atomized into a combustion chamber 17 by a fuel injection system comprising a fuel injection assembly 20, the mixture being subsequently ignited for generating hot combustion gases before passing through a turbine section 18 for extracting energy from the combustion gases.

Figure 2:
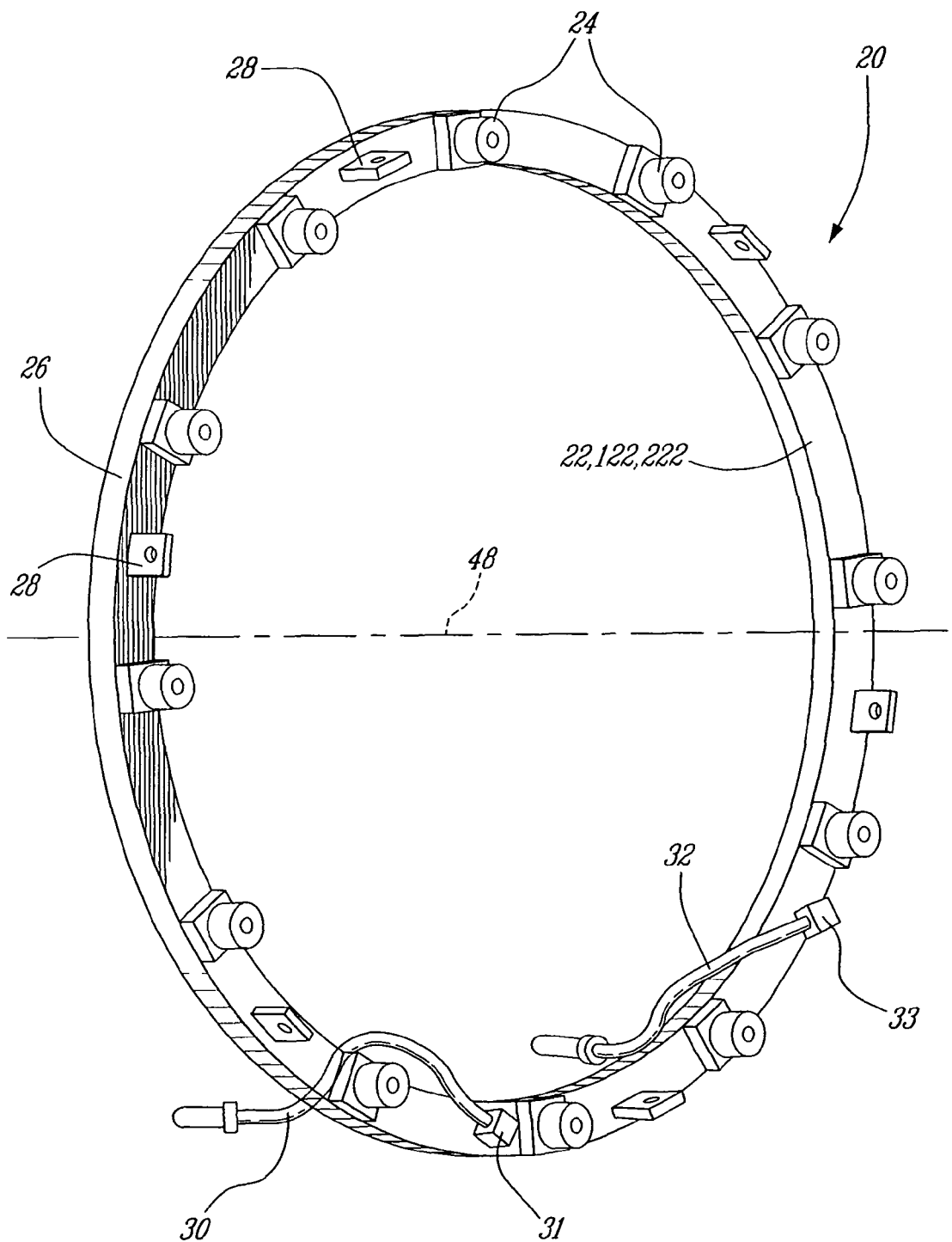
FIG. 2 is a perspective view of a fuel injection system of a gas turbine engine such as shown in FIG. 1, including an internal fuel manifold.

Referring to FIG. 2, the fuel injection assembly 20 comprises an annular fuel manifold 22, 122, 222 generally disposed adjacent the combustion chamber 17 (see FIG. 1) of the engine 10, and mounted via several integral attachment lugs 28 for fixing the manifold 22, 122, 222 to an appropriate support structure. The fuel injection assembly 20 also comprises a plurality of fuel injector spray tip assemblies 24 mounted on the manifold 22, 122, 222, which atomize the fuel for combustion. The exterior of the manifold 22, 122, 222 is covered by an outer heat shield 26. This provides the fuel manifold 22, 122, 222 thermal protection from the high temperature environment. A primary fuel inlet pipe 30 and a secondary fuel inlet pipe 32, via inlets 31 and 33, respectively, provide dual though independent fuel feeds to the manifold 22, 122, 222, which then distributes the two fuel supplies to the spray tip assemblies 24. The spray tip assemblies 24 can be directly mounted to the annular fuel manifold 22, 122, 222, i.e. without being interconnected thereto through corresponding nozzle stems.

Figure 3:
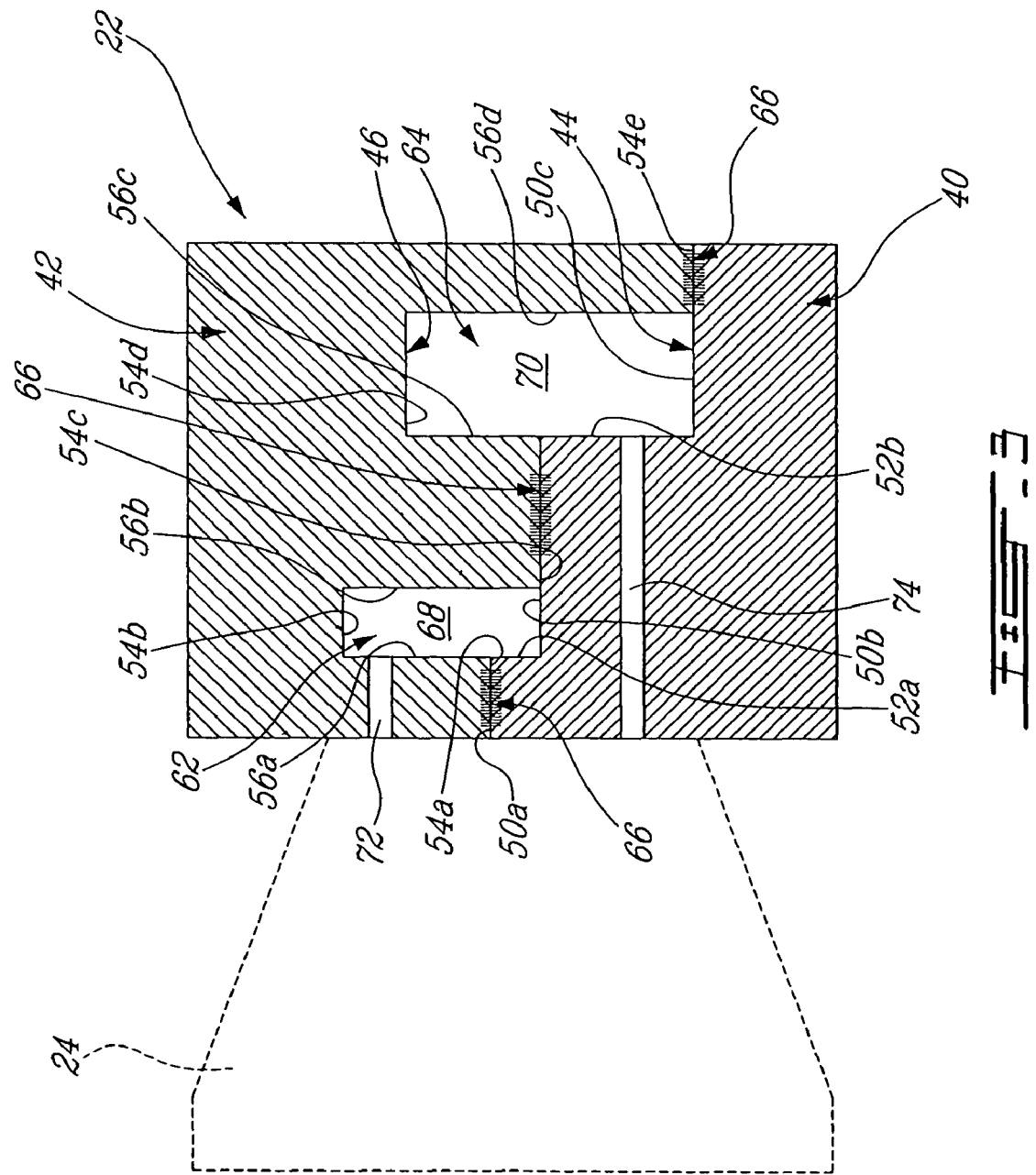
FIG. 3 is a cross-sectional view of the fuel manifold of FIG. 2 according to a particular embodiment of the present invention.

Referring to FIG. 3, the manifold ring 22 according to one embodiment is shown. The annular manifold 22 constitutes a fuel conveying member. However, it is to be understood that other, non-annular, fuel conveying members can also be used. Thus, the term "fuel conveying member" as used herein is intended to include linear fuel nozzle stems, fuel manifolds of all types and shapes, and the like. The manifold 22 includes a first member portion 40 and a second member portion 42, which are both annular. The member portions 40, 42 cooperate to interlock together and are sealingly engaged to one another along inner surfaces 44, 46 thereof. The two member portions share a common central axis 48 (see FIG. 2), and the inner surfaces 44, 46 are engaged substantially circumferentially with respect to the axis 48.

The inner surface 44 of the first member portion 40 includes three circumferential walls 50a,b,c (i.e. extending circumferentially with respect to the axis 48) and two radial walls 52a,b (i.e. extending radially with respect to the axis), alternating to define a stepped configuration.

The inner surface 46 of the second member portion 42 includes five circumferential walls 54a,b,c,d,e alternating with four radial walls 56a,b,c,d. The adjacent first radial wall 56a, second circumferential wall 54b and second radial wall 56b together define a first channel 62. The adjacent third radial wall 56c, fourth circumferential wall 54d and fourth radial wall 56*d* together define a second channel 64. Each wall of both member portions 40, 42 is straight and extends perpendicularly from the adjacent wall(s).

The first, second and third circumferential wall 50*a,b,c* of the first member portion 40 are respectively sealingly engaged to the first, third and fifth circumferential walls 54*a, c,e* of the second member portion 42. The member portions 40, 42 are thus sealingly engaged along three separate locations 66.

The first radial wall 52*a* of the first member portion 40 is aligned with the first radial wall 56*a* of the second member portion 42, and the second radial wall 52*b* of the first member portion 40 is aligned with the third radial wall 56*c* of the second member portion 42. A conduit 68 is defined by the first channel 62 of the second member portion 42 and by part of the first radial wall 52*a* and of the second circumferential wall 50*b* of the first member portion 40. Another conduit 70 is defined by the second channel 64 of the second member portion 42 and by the second radial wall 52*b* and part of the third circumferential wall 50*c* of the first member portion 40. Each conduit 68, 70 is in fluid communication with a respective one of the inlets 31, 33 (see FIG. 1). The inner surfaces 44, 46 of the member portions 40, 42 are thus complementary to each other such that some of the walls of the two member portions 40, 42 are in contact while other walls define conduits 68, 70 at the junction between the two member portions 40, 42.

The member portions 40, 42 also each have an outlet 72, 74 defined therein connecting a respective one of the conduits 68, 70 to the spray tip assembly 24, which is schematically depicted in broken lines.

In a particular embodiment, the manifold is manufactured as follows. The inner surface 44, 46 of each of the member portions 40, 42 is machined such as to form the corresponding walls, for example through a turning operation. The two inner surfaces 44, 46 are machined in a complementary manner in order to define the conduits 68, 70 described above. The member portions 40, 42 are then sealingly engaged to one another through a sealed connection formed in the contacting walls 50*a*, 54*a*; 50*b*, 54*c*; 50*c*, 54*e*, for example through brazing.

Figure 4:
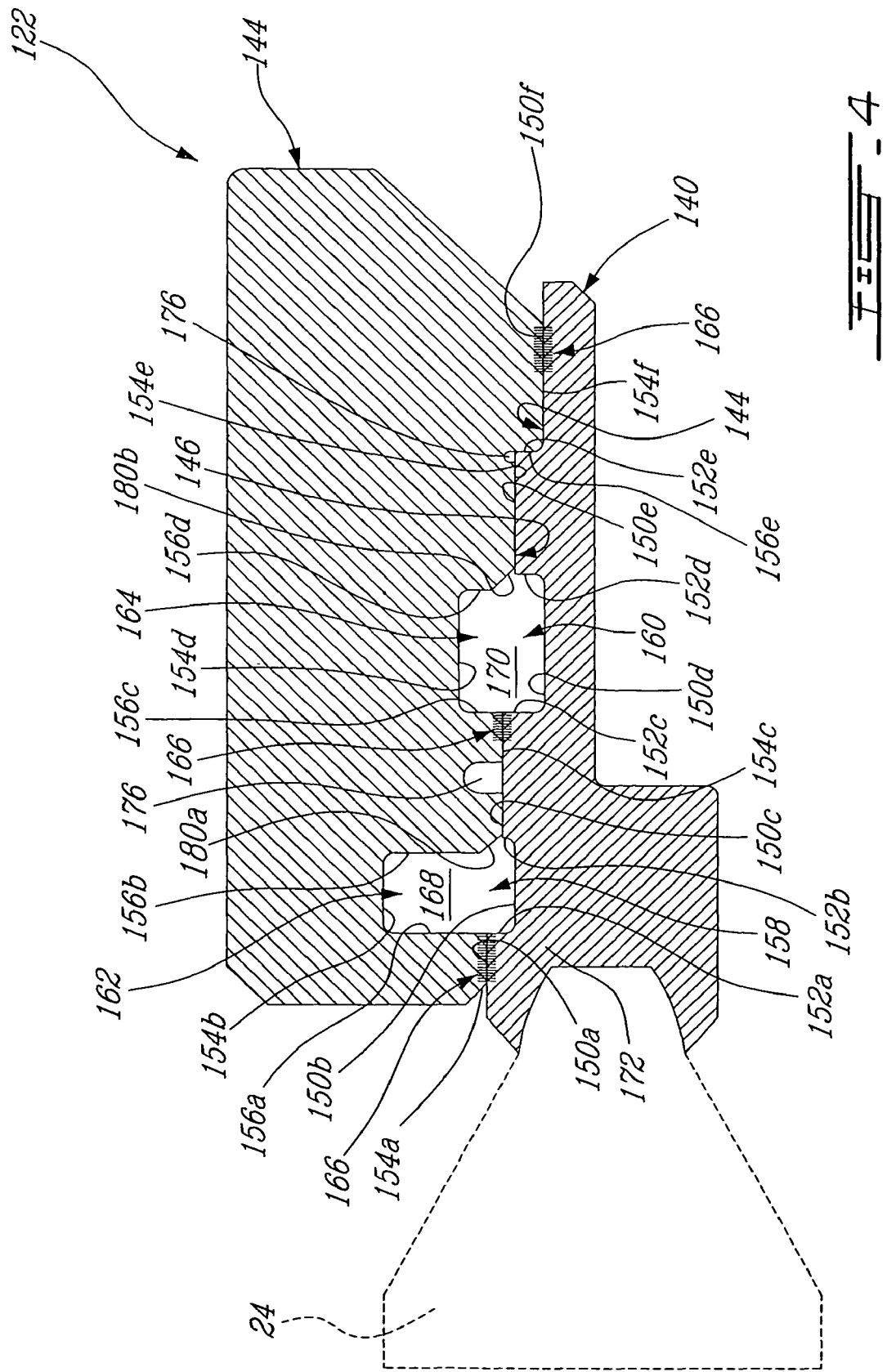
FIG. 4 is an alternate cross-sectional view of the fuel manifold of FIG. 2 according to another embodiment of the present invention.

Referring to FIG. 4, another embodiment of the manifold 122 according to an alternate aspect of the present invention is shown. The manifold 122 also includes first and second annular member portions 140, 142 having inner surfaces 144, 146 sealingly engaged substantially circumferentially with respect to the axis 48 (see FIG. 2) of the member portions 140, 142.

The inner surface 144 of the first member portion 140 includes six circumferential walls 150*a,b,c,d,e,f* alternating with five radial walls 152*a,b,c,d,e*. The adjacent first radial wall 152*a*, second circumferential wall 150*b* and second radial wall 152*b* together define a first channel 158. The adjacent third radial wall 152*c*, fourth circumferential wall 150*d* and fourth radial wall 152*d* together define a second channel 160. The fifth and sixth circumferential walls 150*e,f* are stepped.

The inner surface 146 of the second member portion 142 includes six circumferential walls 154*a,b,c,d,e,f* alternating with five radial walls 156*a,b,c,d,e*. The adjacent first radial wall 156*a*, second circumferential wall 154*b*, second radial wall 156*b* and a small oblique wall 180*a* interconnecting the second radial wall 156*b* to the third circumferential wall 154*c* together define a first channel 162. The adjacent third radial wall 156*c*, fourth circumferential wall 154*d*, fourth radial wall 156*d* and a small oblique wall 180*b* interconnecting the fourth radial wall 156*d* to the fifth circumferential wall 154*e* define a second channel 164. The fifth and sixth circumferential walls 154*e,f* are stepped. Each wall of both member portions 140, 142 is straight, and the connection between adjacent circumferential and radial walls is rounded.

The first, third, fifth and sixth circumferential walls 150*a, c,e,f* of the first member portion 140 are respectively sealingly engaged to the first, third, fifth and sixth circumferential walls 154*a,c,e,f* of the second member portion 142. The member portions 140, 142 are thus sealingly engaged along three separate locations 166. A small recess 176 is defined in each of the third and fifth circumferential walls 154*c,e* of the second member portion 142 in order to facilitate the propagation of the sealing agent, which can be for example braze.

The first channels 158, 162 of both member portions 140, 142 are aligned, and the second channels 160, 164 of both member portions 140, 142 are aligned. Two conduits 168, 170 are thus defined by the complementary channels 158, 162; 160, 164 of the member portions. Each conduit 168, 170 is in fluid communication with at least a respective one of the inlets 31, 33 (see FIG. 1).

The first member portion 140 also has an outlet 172 defined therein connecting one conduit 168 to the spray tip assembly 24, which is schematically depicted in broken lines. The other conduit 170 is either connected to another one of the spray tip assemblies (not shown) or used to transport coolant such as recirculated fuel. Alternately, the other conduit 170 can also be connected to the spray tip assembly 24 through an outlet (not shown) defined in one of the member portions 140, 142.

The manifold 122 is manufactured using a process similar to that described above.

Figure 5:
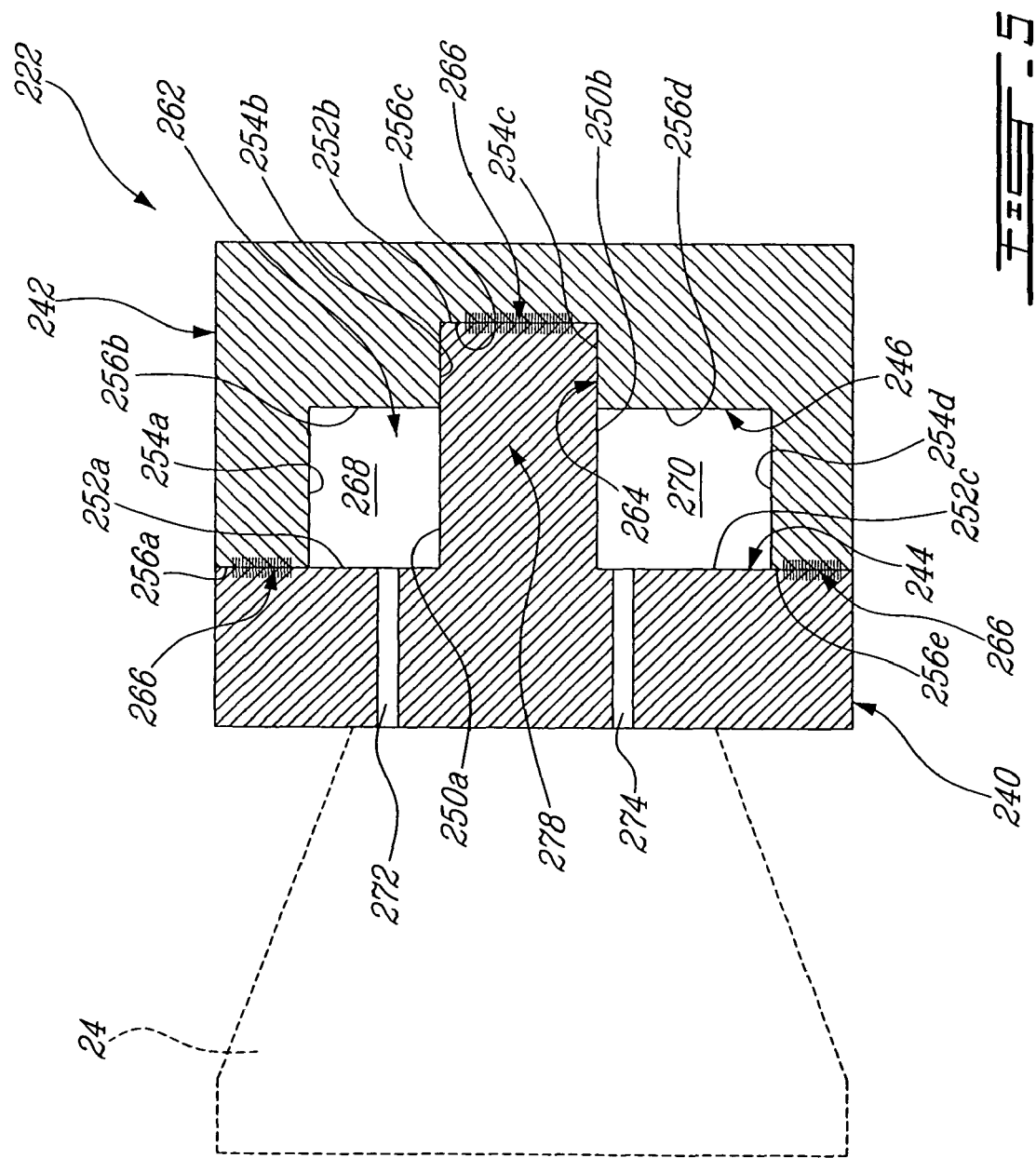
FIG. 5 is another alternate cross-sectional view of the fuel manifold of FIG. 2 according to a further embodiment of the present invention.

Referring to FIG. 5, a further embodiment of the manifold 222 according to another alternate aspect of the present invention is shown. The manifold 222 also includes first and second annular member portions 240, 242 sealingly engaged to one another. Contrary to the previous embodiments shown, the inner surfaces 244, 246 here are engaged substantially radially with respect to the axis 48 (see FIG. 2) of the member portions 240, 242.

The inner surface 244 of the first member portion 240 includes three radial walls 252*a,b,c* alternating with two circumferential walls 250*a,b*. The first and third radial walls 252*a,c* are substantially aligned, and the second radial wall 252*b* is offset from the first and third radial walls 252*a,c* such as to define a finger 278.

The inner surface 246 of the second member portion 242 includes five radial walls 256*a,b,c,d,e* alternating with four circumferential walls 254*a,b,c,d*. The first circumferential wall 254*a*, second and fourth radial walls 256*b,d*, and fourth circumferential wall 254*d* together define a large channel 262. The adjacent second circumferential wall 254*b*, third radial wall 256*c* and third circumferential wall 254*c* define a small channel 264 which is stepped with the large channel 262. Each wall of both member portions 240, 242 is straight and extends perpendicularly from the adjacent walls.

The first, second and third radial walls 252*a,b,c* of the first member portion 240 are respectively sealingly engaged to the first, third and fifth radial walls 256*a,c,e* of the second member portion 242. The member portions 240, 242 are thus sealingly engaged along three separate locations 266.

The finger 278 is aligned with the small channel 264 and received therein. A conduit 268 is defined by part of the first radial wall 252*a* and of the first circumferential wall 250*a* of the first member portion 240 and by the first circumferential wall 254*a* and the second radial wall 256*b* of the second member portion 242. Another conduit 270 is defined by part of the second circumferential wall 250*b* and of the third radial wall 252*c* of the first member portion 240 and by the fourth radial wall 256*d* and fourth circumferential wall 254*d* of the second member portion 242. Each conduit 268, 270 is in fluid communication with a respective one of the inlets 31, 33 (see FIG. 1).

The first member portion 240, 242 also includes one outlet 272, 274 connecting each of the conduits 268, 270 to the spray tip assembly 24, which is schematically depicted in broken lines.

The manifold 222 is manufactured using a process similar to that described above.

The manifold 22, 122, 222 thus presents several advantages. It is relatively simple to manufacture, since the machining of complementary surfaces can be easily done for an optimal fit between the two member portions 40, 42, 140, 142, 240, 242. Also, the outlets 72, 74, 172, 272, 274 can be drilled or otherwise machined in the member portions 40, 42, 140, 142, 240, 242 prior to assembly, thus simplifying the manufacturing process.

The number of sealing joints 66, 166, 266 is kept to a minimum, i.e. one more than the number of sealed conduits 68, 70, 168, 170, 268, 270, which reduces the risks of joint failure which can cause leakage. The outermost joints can be easily visually inspected. The inner joints are generally exposed to lower pressure gradients there-across (because the difference in pressure between the two fuel conduits is much less than the difference between each conduit and the surrounding atmosphere), and therefore leaking across the inner joints (i.e. between internal conduits) is less dangerous. Nonetheless, such inner joints can still be inspected using known techniques such as x-ray inspection, visual boroscope inspection, and the like. The reduced number of sealing joints 66, 166, 266 and the efficiency of the inspection increase the engine safety.

Moreover, since the shape and size of the conduits 68, 70, 168, 170, 268, 270 is determined by the machining in the inner surface 44, 46, 144, 146, 244, 246 of the member portions 40, 42, 140, 142, 240, 242, but is independent of the remaining (outer) surfaces of the member portions 40, 42, 140, 142, 240, 242. Thus the outer geometry of the manifold 22, 122, 222 can be optimized in accordance with other important parameters, for example weight and vibratory stress minimization, without affecting the configuration of the conduits 68, 70, 168, 170, 268, 270.

In addition, the joints 66, 166, 266 are mainly under shear stress, as opposed to prior art joints which tend to be principally exposed to tensile stress. Fuel pressure within the conduits 68, 70, 168, 170, 268, 270 of the manifolds 22, 122, 222 will try to "stretch" the outer rings and "compress" the inner rings thereof, and as such it is mainly the rigidity of the two machined rings which withstands this fluid pressure and thus guarantees the structural integrity of the manifold, and therefore does not rely principally on the strength of the brazed joints as is the case in most prior art manifolds having cover plates brazed overtop of open channels in the manifold. The configuration of the manifolds 22, 122, 222 is therefore such that the joints 66, 166, 266 are generally more able to resist shear stresses, and therefore the overall strength of the joints 66, 166, 266 is increased. While the brazed joints 66, 166, 266 will also experience some tensile stress, the level of these tensile stresses will be greatly reduced compared to the prior art manifold configurations. The joints 66, 166, 266 of the manifolds 22, 122, 222 are therefore not over stressed and thus work mainly, although not exclusively as some load bearing is provided, as a sealing device. For example only, the design of the manifold 122 is particularly efficient for reducing (but not completely eliminating) tensile stresses on the joints 166 thereof, and therefore as a result the shear stresses therein are accordingly reduced as well.

The above description is meant to be exemplary only, and one skilled in the art will recognize that changes may be made to the embodiments described without department from the scope of the invention disclosed. For example, the walls of the inner surfaces 44, 46, 144, 146, 244, 246 can be curved and/or extend at an angle other than 90 degrees from the adjacent walls. Also, a single conduit can be defined at the junction of the two member portions 40, 42, 140, 142, 240, 242; in this case, the member portions 40, 42, 140, 142, 240, 242 can be sealed along two separate locations 66, 166, 266 only, i.e. on each side of the conduit. Alternately, more than two conduits can be defined at the junction of the member portions 40, 42, 140, 142, 240, 242. More than two member portions can also be used, the walls of the member portions cooperating to define the conduit(s) at the junction of two or more of the member portions. The structure and method described can be used with other types of fuel conveying members, including but not limited to fuel nozzle stems. Still other modifications which fall within the scope of the present invention will be apparent to those skilled in the art, in light of a review of this disclosure, and such modifications are intended to fall within the appended claims.

What is claimed is:

1. A gas turbine engine fuel injection assembly comprising:
    an internal fuel manifold being annular and extending around a central axis, the fuel manifold having a plurality of fuel nozzles disposed about a circumference thereof, each of said fuel nozzles being in fluid flow communication with at least two fuel conduits defined within the fuel manifold such that the fuel conduits of the fuel manifold deliver fuel flow to any one or more of the fuel nozzles at their respective circumferentially spaced apart locations about the annular fuel manifold, the fuel manifold comprising first and second ring portions cooperating to provide a manifold body and to define therebetween the at least two fuel conduits;
    wherein the first ring portion includes a first circumferentially-extending inner surface including a plurality of first walls cooperating to define a plurality of channels defined in the first circumferentially-extending inner surface, and the second ring portion includes a second circumferentially-extending inner surface including a plurality of second walls cooperating to define a plurality of channels defined in the second circumferentially-extending inner surface, the first and second circumferentially-extending inner surfaces sealingly engaging one another about their respective circumferences at least three separate sealing locations on each ring portion, at least two of said three sealing locations being radially offset from each other so that said sealingly engaged first and second circumferentially-extending inner surfaces define a step, the said sealing locations being disposed between adjacent said channels, the channels of each said ring portion and the at least three sealing locations cooperating to define the at least two fuel conduits within the manifold body; and
    wherein the at least two fuel conduits being sealingly separated from one another to provide independent fuel feeds to each of the fuel nozzles, an intermediate one of the at least three locations being disposed between the at least two fuel conduits, the ring portions being joined by a braze at said intermediate location in a manner preventing fuel leakage from one fuel conduit to another.

2. The fuel conveying member as defined in claim 1, wherein each of the fuel conduits is defined by at least part of two of the first walls and at least part of two of the second walls.

3. The fuel conveying member as defined in claim 1, wherein each of the first walls extends substantially perpendicularly to each one of the subsequent, immediately adjacent and contacting one of the first walls, and each of the second walls extends substantially perpendicularly to each one of the subsequent, immediately adjacent and contacting one of the second walls.

4. The fuel conveying member as defined in claim 1, wherein each of the locations is defined by one of at least two non-subsequent ones of the first walls which are not in contact with each other and sealingly engaged to a respective one of two-non-subsequent ones of the second walls which are also not in contact with each other.

5. The fuel conveying member as defined in claim 1, wherein the first and second ring portions are concentric, the first and second inner surfaces being sealingly engaged along a full circumference thereof.

6. The fuel conveying member as defined in claim 1, wherein the first and second ring portions are concentric, the first and second circumferentially-extending inner surfaces having a radially facing sealing interface.

7. The fuel conveying member as defined in claim 1, wherein the first and second walls are straight.

8. The fuel conveying member as defined in claim 1, wherein the fuel conduits and locations are axially spaced apart from one another within the manifold body.

9. The fuel conveying member as defined in claim 1, wherein all of said sealing locations are radially offset from each other.

10. A gas turbine engine fuel injection system comprising:
an annular internal fuel manifold extending around a central axis and a plurality of fuel nozzles disposed about a circumference of the fuel manifold, each of said fuel nozzles being in fluid flow communication with the fuel manifold such that the fuel conduits of the fuel manifold deliver fuel flow to any one or more of the fuel nozzles at their respective circumferentially spaced apart locations about the fuel manifold, the fuel manifold comprising:
at least first and second ring portions sealingly engaged to one another about their respective circumferences at least three separate sealing locations, the three sealing locations being axially spaced apart; and
means for conveying fuel defined at a junction between the first and second ring portions, the means for conveying fuel providing at least two least two independent fuel conduits defined within the fuel manifold to deliver fuel flow to any one or more of the fuel nozzles and being defined by at least part of two different walls of each of the first and second ring portions, and wherein the independent fuel conduits are sealingly enclosed by said at least three separate sealing locations, the three sealing locations including at least one central seal and two outer seals, the central seal extending continuously between the fuel conduits to seal against fluid flow communication from one conduit to another, and including a brazed joint between the first and second ring portions at a location between the two sealed fuel conduits, and the outer seals extending continuously between the first and second ring portions on opposed axial outer edges of the fuel manifold to sealing enclose the fuel conduits, at least two of said sealing locations being radially offset from each other to define a step in said first and second ring portions which are sealingly engaged to form the fuel manifold.

11. The gas turbine engine fuel injection system as defined in claim 10, wherein the at least part of the two different walls include at least part of two adjacent walls of each of the first and second ring portions defining a first one of the conduits and at least part of two other adjacent walls of each of the first and second ring portions defining a second one of the conduits.

12. The gas turbine engine fuel injection system as defined in claim 10, wherein the two different walls are adjacent.

13. The gas turbine engine fuel injection system as defined in claim 10, wherein all of said sealing locations are radially offset from each other.

* * * * *